United States Patent

[11] 3,625,971

[72] Inventor Laszlo Ambrus
Oakland, Calif.
[21] Appl. No. 721,937
[22] Filed Apr. 17, 1968
[45] Patented Dec. 7, 1971
[73] Assignee Cutter Laboratories, Inc.
Berkeley, Calif.

[54] LOWER ALKYLESTERS OF 1-(DISUBSTITUTED PHENYL OR BENZYL)-1H-INDAZOL-3-YLOXY ACETIC ACIDS
9 Claims, No Drawings

[52] U.S. Cl. .................................................... 260/310 C,
260/349, 260/544 C, 260/562 R, 260/562 P, 260/576, 260/618 D, 260/651 R, 424/273
[51] Int. Cl. ............................................................ C07d 49/02
[50] Field of Search ............................................ 260/310 B

[56] References Cited
UNITED STATES PATENTS
3,470,194  9/1969  Palazzo ........................ 260/310 B FOREIGN PATENTS
1,054,833  1/1967  Great Britain ................ 260/310 B
1,088,973  10/1967  Great Britain ................ 260/310 B

*Primary Examiner*—Natalie Trousof
*Attorneys*—Bertram Bradley and Dean Laurence ABSTRACT: Chemical compounds in which the hydroxyl hydrogen atom of a 1-(disubstituted phenyl or benzyl)-1H-indazol-3-ol is replaced by a carb-lower alkoxymethyl group yielding the corresponding lower alkyl esters of 1-(disubstituted phenyl or benzyl)-1H-indazol-3-yloxy acetic acid are described.

The compounds can be prepared by forming the sodium salt of the indazol-3-ol by effecting a Williamson Ether Synthesis reaction with carb-lower alkoxymethyl halide.

The compounds possess anti-inflammatory activity as demonstrated by the Limb Volume Test procedure.

LOWER ALKYLESTERS OF 1-(DISUBSTITUTED PHENYL OR BENZYL)-1H-INDAZOL-3-YLOXY ACETIC ACIDS

This invention relates to compositions of matter classified in the art of chemistry as 1(disubstituted phenyl or benzyl)-1H-indazol-3-ols.

The invention sought to be patented resides in the concept of compositions of matter having a molecular structure in which the indazole nucleus bearing a 1-disubstituted phenyl or benzyl radical, has at its 3-position an ether oxygen atom also bearing a lower alkoxyacetate group, and at least one of the substituents on the phenyl or benzyl rings is the trifluoromethyl radical; and in processes for making the same.

The tangible embodiments of the invention possess the inherent applied use characteristics of exhibiting pharmacological activity, as anti-inflammatory agents. An additional utility of these compositions of matter is their inherent ability to fluoresce on exposure to ultraviolet radiation. This property of the said composition aspect renders them useful as optical brighteners, e.g., in detergent formulations.

In another of my applications entitled "1-(disubstituted phenyl or benzyl)-1H-indazol-3-yloxy acetic acids," the acids corresponding to these esters were disclosed to have the same kind of anti-inflammatory activity as the esters of this invention. However, the esters are superior to the acids in that larger doses can be administered than the acids before any undesirable side effects are notices. For example, ethyl [1(3,5-bis[trifluoromethyl]phenyl)-1H-indazol-3-yloxy]acetate has a lower order of oral toxicity when administered to rats compared to the corresponding acid. When both are administered at the rate of 180 milligrams per kilogram of rat the acid is lethal but the ester is not. Of course, these levels of dosage are higher than are normally employed but the difference would be significant in sensitive individuals. In addition, this ester did not induce ulceration in rats at dosages of 800 milligrams per kilogram of rat, which is eight times the dosage at which phenylbutazone, a well-known anti-inflammatory agent, will show ulceration.

The lower-alkoxyacetoxy group has the structure $$-O-CH_2-\overset{\overset{O}{\|}}{C}-OR$$

wherein R represents lower-alkyl. As used herein, the term "lower-alkyl" includes straight and branched alkyl groups among which are, for purposes of illustration but without limiting the generality of the foregoing: methyl, ethyl, propyl, isopropyl, n-butyl, secondary-butyl, isobutyl, tertiary butyl, isoamyl, betahydroxyethyl, beta-ethoxyethyl, beta-methoxyethyl, and gamma-hydroxypropyl. The lower esters are preferred, especially the methyl, ethyl and propyl esters. The basic esters where R is a radical, such as diethylaminoethyl, also have the same utility as the forgoing esters.

The alpha carbon atom of the acetoxy portion of the compounds of this invention can bear substituents, e.g., carboxy, carb-lower-alkoxy including carbomethoxy, carbethoxy, carbopropoxy and carbobutoxy; lower-alkyl, including methyl, ethyl, propyl or butyl; lower-alkoxy, including methoxy, ethoxy, and propoxy; and lower-alkylene including methylene and ethylene. Of these substituents, the methyl, ethyl, carboxy, and carb-lower-alkoxy are preferred.

The disubstituted phenyl or benzyl portion of these compounds bear a trifluoromethyl group, preferably at the three-position of the phenyl or benzyl ring. The other substituent or substituents on the 1-phenyl or 1-benzyl ring include, for purposes of illustration, trifluoromethyl; halogen including fluoro and chloro; lower-alkyl including methyl, ethyl and propyl. Of these, the trifluoromethyl, chloro and methyl groups are preferred.

While the invention has been illustrated with a trifluoromethyl group in three-position of the 1-phenyl or 1-benzyl ring it will be apparent to those skilled in the art, from the description herein given so to the compounds having a trifluoromethyl group in the three-position, appropriate selection of starting material in which the trifluoromethyl group is in the two-, four- or five-position and a substituent of the type herein before enumerated is also present on the ring will enable production of 2,5-, 2,3-, and 3,4disubstituted compounds within the scope of the invention having the same applied use characteristics as the three-position compounds herein specifically described.

The four-, five-, and six- and seven-positions of the indazole ring of the compounds of this invention can also optionally bear substituents among which are, for example, trifluoromethyl, halogen, including fluoro and chloro; lower-alkyl, including methyl, ethyl, and propyl; acetamido; nitro; and lower-alkoxy, including methoxy, ethoxy, propoxy, and butoxy. The preferred compounds, however, are unsubstituted in the benzenoid portion.

The manner of making and using the invention will now be generally described so as to enable a person skilled in the art to make and use the same.

The compounds of this invention are prepared by the etherification of the hydroxy group of a 1-(disubstituted phenyl or bezyl-1H-indazol-3-ol with an acetoxy etherifying agent to produce the corresponding ether.

Acetoxy ethers of 1-phenyl- or 1-benzyl- indazol-3-ol can be prepared using the Williamson Ether Synthesis whereby the alkali metal salt of a 1-phenyl- or 1benzyl- indazol-3-01 is brought in contact with a halo (bromo) ester, the reaction being carried out in a solvent inert to the reactants.

The 1-phenyl- indazol-3-01 employed in the Williamson Ether Synthesis is prepared by a series of reactions beginning with the amine compounds bearing the substituents, if any, corresponding to the substituents desired on the 1-pheyl-portion of the indazol-3-01. The amine compound is acetylated, e.g., with acetic anhydride. The resulting acetamide is arylated using bromobenzene bearing the substituents, if any, desired on the benzenoid portion of the indazole end produce, potassium carbonate and catalytic amounts of potassium iodide and cuprous bromide in nitrobenzene solvent, to obtain the corresponding N-phenyl substituted acetamide. Hydrolysis of the resulting acetamide with hydrochloric acid in ethanol yields the disubstituted amine, which is then reacted with an excess of phosgene at —5° to —5° C. to yield the substituted carbamoyl chloride. The reaction of sodium azide with the substituted carbamoyl chloride yields the corresponding carbamoyl azide which is decomposed, rearranged and cyclized in refluxing solvent, such as xylene, to yield the 1-substituted indazol-3-ol. These reaction can be illustrated for the 1-phenyl compounds as follows:

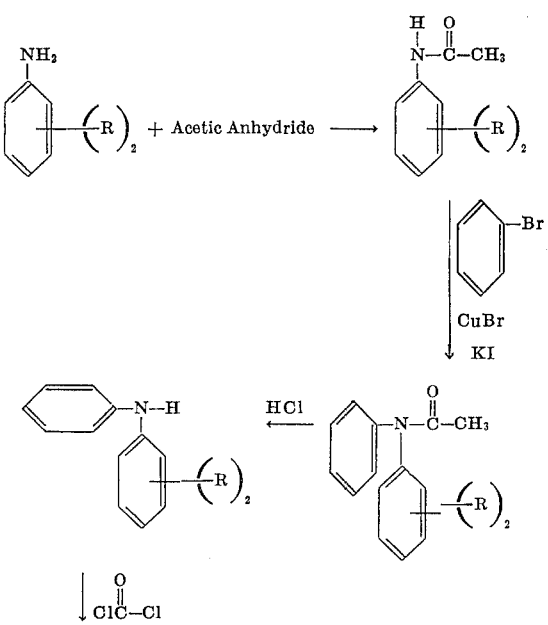

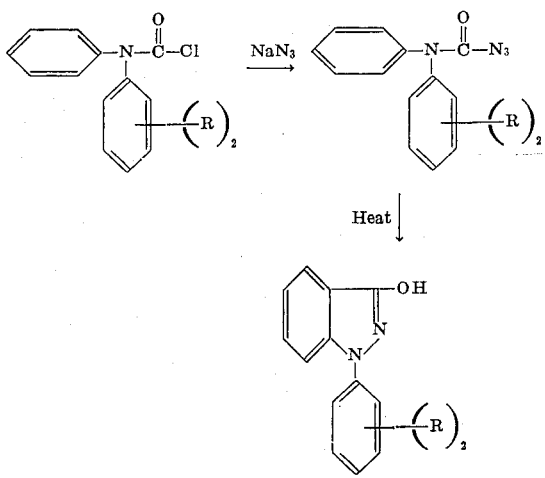

The novel chemical compounds are useful, particularly in the field of pharmacology because of their anti-inflammatory activity.

The anti-inflammatory activity of said composition aspect is observed in laboratory animals after inflammation has been induced by subcutaneous injection of carrageenin. Reduction of the induced inflammation is observed when the test animals are treated with the composition aspect of this invention. Such treatment can be accomplished by subcutaneous injection or oral administration or topical administration of the composition aspect of this invention.

The limp volume test for 11 activity is employed to test the activity of the composition aspect of this invention, In the procedure employed, male rats averaging 140–160 grams in weight were used. The volume of the left hind foot was measured by a mercury displacement method immediately before and 24 hours after a subplantar injection of 0.1 ml. of a 1 percent suspension of a carrageenin in water.

Test substances were administered subcutaneously or orally in olive oil in 5 equal doses. Two doses were given the day prior to and 2 doses the day of injection of carrageenin, and the final does was given the day of final limb measurement. Olive oil alone was used as a negative control.

Percent increase in limb volume produced by carrageenin was calculated for each group. Percent change from control was also calculated for all treatment groups. A reduction in the increase in limb volume in animals given a test compound evidences an active response.

Food consumption and body weight were recorded for all groups as indices of systemic toxicity.

The foregoing discussion is offered to illustrate methods suitable for the practice of out invention and not to limit its scope. The invention is further illustrated by the following preparations and examples.

The following steps are employed in the preparation of disubstituted 1-phenyl-1H-indazol-3-ol compounds used as precursors for the compounds of this invention.

Preparation 1: 1-[3,5-bis(trifluoromethyl)phenyl]-1H-indazol-3-ol.

Step 1: 3', 5'-bis(trifluoromethyl)acetanilide

Two hundred grams of 3,5-bis(trifluoromethyl)aniline was dissolved in 300 ml. of dry benzene and 102 grams of acetic anhydride was added during a period of 1 hour with stirring. The reaction mixture was refluxed for 1 hour and allowed to cool at room temperature. It was then diluted with 300 ml. of pentane and the 3', 5'-bis(trifluoromethyl)acetanilide was filtered off as white crystals melting at about 150°–152° C.

Step 2: N-phenyl-3', 5'-bis(trifluoromethyl)acetanilide

Two hundred thirty grams of 3', 5'-bis(trifluoromethyl)-acetanilide, 167 grams bromobenzene, 210 grams potassium carbonate, and 4 grams each of potassium iodide and cuprous bromide was placed in 600 ml. of nitrobenzene. The well-stirred mixture was heated to 170°–200° C. for 28 hours. The nitrobenzene was steam-distilled from the reaction mixture and the residue, after cooling to room temperature, was partitioned in ether-water. The ether layer was washed with water, the ether was removed under reduced pressure, and the oily residue was crystallized from pentane to give N-phenyl-3', 5'-bis(trifluoromethyl)acetanilide, white crystals, melting at about 79°–80° C.

Step 3: 3,5-bis(trifluoromethyl)diphenylamine

Two hundred forty grams of N-phenyl-3', 5'-bis(trifluoromethyl)acetanilide was dissolved in a mixture of 300 ml. of ethanol and 300 ml. of concentrated hydrochloric acid. The reaction mixture was refluxed for 3 hours. The alcohol was removed under reduced pressure, the residue diluted with 2 liters of water and extracted three times with ether. The combined ether fractions were washed with water and the ether boiled off. The oily residue was crystallized from pentane to give 3,5-bis(trifluoromethyl)diphenylamine, white crystals, melting at about 81°–82° C.

Step 4: 3,5-bis(trifluoromethyl)diphenylcarbamoyl chloride

Ninety grams of phosgene was trapped in 300 ml. of chloroform at −10° C. and to this stirred solution was added a solution of 200 grams of 3,5-bis(trifluoromethyl)diphenylamine and 80 grams of pyridine in 200 ml. of chloroform over a period of 1 hour. The temperature of the reaction mixture was kept at −5° to +5° C. during the addition, then allowed to warm to room temperature, where it was stirred for 1 hour and refluxed for 2 hours, cooled and poured on ice. The chloroform layer was washed repeatedly with water. The chloroform was removed under reduced pressure and the residual solid was suspended in pentane and filtered to give 3,5-bis(trifluoromethyl)diphenylcarbamoyl chloride, white crystals, melting at about 77°–78° C.

Step 5: 3,5-bis(trifluoromethyl)diphenylcarbamoyl azide

Two hundred grams of 3,5-bis(trifluoromethyl)diphenylcarbamoyl chloride was dissolved in 500 ml. of acetone, stirred and warmed to reflux. Fifty grams of sodium azide in 200 ml. of water was added over a period of 1 hour. The acetone was removed under reduced pressure and the cooled reaction mixture extracted twice with 500 ml. portions of ether. The ether was removed under reduced pressure and the residue crystallized from pentane to give 3,5-bis(trifluoromethyl)diphenycarbamoyl azide white crystals, melting at about 79°–81° C.

Step 6: 1-[3,5-bis(trifluoromethyl)phenyl]-1H-indazol-3-ol

To 1500 ml. of p-xylene heated to reflux was added a solution of 200 grams of 3,5-bis(trifluoromethyl)diphenylcarbamoyl azide in 500 ml. of p-xylene over a period of 3 hours. The reaction mixture was refluxed for additional 2 hours during which 1.5 liter of the solvent was allowed to boil off. The residue was cooled, filtered and recrystallized from hot ethanol to give 1-[3,5-bis(trifluoromethyl)phenyl]-1H-indazol-3-ol, white crystals, melting at about 224°–226° C.

Preparation 2: 1-[2-chloro-5-trifluoromethylphenyl]-1H-indazol-3-ol.

By means of the six-step procedure described in Preparation 1, 1-[2-chloro-5-trifluoromethylphenyl]-1H-indazol-3-ol melting at 191°–193° C. is prepared.

The 1-benzyl-1H-indazol-3-ols are prepared by a different process than that employed for 1-phenyl-1H-indazol-3-ols. The benzyl halide, bearing any desired substituents on the benzyl ring, is caused to react with the reaction mixture resulting from the reaction of an alkali metal alkoxide and indazolone. The corresponding 1-benzyl-1H-indazol-3-ol is obtained on working up the reaction mixture.

Substituted benzyl halides are prepared by conventional reactions, e.g., reaction of a substituted phenyl bromide with magnesium to form a Grignard reagent which in turn is reacted with formaldehyde to form a substituted benzyl alcohol. The benzyl alcohol is converted to the benzyl halide by reaction with concentrated halo acids, e.g., hydrochloric acid and hydrobromic acid. These are shown in the following preparation.

Preparation 3: 1-[3,5-bis(trifluoromethy)benzyl]-1H-indazol-3-ol.

Eight grams of magnesium were covered with dry diethyl ether and a solution of 100 grams of 3,5-bis(trifluoromethyl)bromobenzene in 400 ml. of dry diethyl ether was added at a rate to maintain reflux of the solvent. After the addition was complete, the reaction mixture was warmed and refluxed for an additional hour. By the procedure described *Organic Syntheses*, Vol. 1, page 188, formaldehyde obtained from 30 grams of paraformaldehyde was added to the Grignard reagent. The reaction mixture was poured onto ice containing hydrochloric acid and the ethereal solution washed several times with water. The organic layer was dried over magnesium sulfate, filtered, the solvent was boiled off and the residue distilled under reduced pressure to give the desired 3,5-bis(trifluoromethyl)benzyl alcohol, melting at about 44°–45° C. (boiling at 100° C. at 14 ml. pressure).

To 55 grams of 3,5-bis(trifluoromethyl)benzyl alcohol was added 200 ml. 48 percent hydrobromic acid and 20 ml. concentrated sulfuric acid. After refluxing for 6 hours, the layers were separated and the aqueous layer was repeatedly extracted with ether. The combined ether extracts were added to the organic layer, washed with water, dried over magnesium sulfate, filtered, and the solvent was boiled off. The residue was distilled under reduced pressure, to give the desired 3,5-bis(trifluoromethyl)benzyl bromide, boiling at 136°–140° C./14 millimeter $n^{26}$ 1.4440.

Forty grams of indazolone and 16.2 grams sodium methoxide was warmed to reflux in 400 ml. ethanol. To this suspension was added 65 grams of 3,5-bis(trifluoromethyl)benzyl bromide over a period of 2 hours, refluxing was continued for 1 additional hour and the mixture was concentrated to 100 ml. It was diluted with water, made acidic with 10 percent hydrochloric acid, filtered, and the product crystallized from isopropanol to give 1-[3,5-bis(trifluoromethyl)benzyl]-1H-indazol-3-ol, melting at about 190°–191° C.

Analysis:
Calculated for: $C_{16}H_{10}F_6N_2O$:    C, 53.36; H, 2.80; N, 7.78
Found   :    C, 53.09; H, 3.05; N, 7.76

In the following examples in which the results from the limb volume test for anti-inflammatory activity are included, the results are reported as follows:

| | |
|---|---|
| SQ | dosage in milligrams per rat injected subcutaneously |
| a. | oral dosage in milligrams per rat. Rats used in these tests averaged 150 grams. |
| b. | oral dosage in milligrams per kilogram of rat body weight |
| Percent Change | the percentage change from the control as measured by the limb volume test |

EXAMPLE 1. Ethyl[1-(3,5-bis[trifluoromethyl]phenyl)-1H-indazol-3-yloxy]acetate.

Seventeen grams of 1-[3,5-bis(trifluoromethyl)phenyl]-1H-indazol-3-ol and 3 grams of sodium methoxide were stirred in a mixture of 200 ml. of acetonitrile and 50 ml. of ethanol, heated to reflux. Nine grams of ethyl bromoacetate were added in 1 hour and the refluxing continued for 2 hours. The hot reaction mixture was filtered, the solvent was removed under reduced pressure, and the residue taken up in 150 ml. of hot ethanol, from which 14 grams crude material was obtained. It was repeatedly crystallized from ethanol to give the desired product, ethyl{1-[3,5-bis(trifluoromethyl)phenyl]-1H-idazol-3-yloxy}acetate, white crystals, melting at about 105°–106° C.

Limb Volume Test

| Dosage | Percent Change From Control |
|---|---|
| 5 (SQ) | 41.8 |
| 20 (b) | 39.5 32.1 |

EXAMPLE 2. Ethyl[1-([2-chloro-5-trifluoromethyl]phenyl)-1H-indazol-3-yloxy]acetate The procedure of example 1 is followed using 1-[(2-chloro-5-trifluoromethyl)phenyl]-1H-indazol-3-ol in place of 1[3,5-bis(trifluoromethyl)phenyl]f-1H-indazol-3-ol. The melting point of the ester is observed to be 105°–106° C.

Analysis:
Calculated: C, 54.21; H, 3.54; N, 7.03
Found : C, 54.44; H, 3.70; N, 6.99

Limb Volume Test

| Dosage | Percent Change From Control |
|---|---|
| 24(a) | 50.0 |
| 12(a) | 23.7 |

EXAMPLE 3. Methyl[1-(3,5-bis[trifluoromethyl]phenyl)-1H-indazol-3-yloxy]acetate.

By the procedure of example 1, using methyl bromoacetate in place of ethyl bromoacetate, the desired methyl [1-(3,5-bis [trifluoromethyl] phenyl)-1H-indazol-3-yloxy]acetate obtained as a white solid, melting at about 92°–93° C.

Analysis:
Calculated for: $C_{18}H_{12}F_6N_2O_3$:    C, 51.68; H, 2.89; N, 6.70
Found   :    C, 51.79; H, 3.02; N, 6.44

Limb Volume Test

| Dosage | Percent Change From Control |
|---|---|
| 5 (SQ) | 32.5 |
| 10 (b) | 26.5 |
| 20 (b) | 30.9 |
| 60 (b) | 55.2 |
| 120 (b) | 44.1 |

EXAMPLE 4. Propyl [1-(3,5-bis[trifluoromethyl]phenyl)-1H-indazol-3-yloxy]

By the procedure of example 1, using n-propyl chloroacetate in place of ethyl bromoacetate, the desired propyl [1-(3,5-bis[trifluoromethyl]phenyl)-1H-indazol-3-yloxy]acetate is obtained as a white solid, melting at about 63°–64° C.

Analysis:
Calculated for: $C_{20}H_{16}F_6N_2O_3$:    C, 53.82; H, 3.61; N, 6.28
Found   :    C, 53.90; H, 3.45; N, 6.12

Limb Volume Test

| Dosage | Percent Change From Control |
|---|---|
| 5 (SQ) | 29.2 |
| 10 (b) | 32.4 |
| 20 (b) | 38.2 |
| 60 (b) | 48.3 |
| 120 (b) | 47.1 |
| 10 (b) | 15.1 |
| 30 (b) | 20.8 |

EXAMPLE 5. Butyl[1-(3,5-bis[trifluoromethyl]phenyl)-1H-indazol-3-yloxy]acetate.

By the procedure of example 1, using n-butyl chloroacetate in place of ethyl bromoacetate, the desired butyl [1-(3,5-bis [trifluoromethyl] phenyl)-1H-indazol-3-yloxy]acetate is obtained as a white solid, melting at about 73°–74° C.

Analysis:
Calculated for: $C_{21}H_{18}F_6N_2O_3$:    C, 54.79; H, 3.94; N, 6.09
Found   :    C, 54.73; H, 3.76; N, 5.98

Limb Volume Test

| Dosage | Percent Change From Control |
|---|---|
| 5 (SQ) | 32.3 |

| | |
|---|---|
| 20 (b) | 29.4 |
| 60 (b) | 50.0 |
| 120 (b) | 38.2 |
| 10 (b) | 11.3 |
| 30 (b) | 22.6 |

EXAMPLE 6. Tert-butyl[1-(3,5-bis[trifluoromethyl]phenyl)-1H-idazol-3-yloxy]acetate By the procedure of example 1, using tert-butyl bromoacetate in place of ethyl bromoacetate, the desired tert-butyl[1-(3,5-bis[trifluoromethyl]phenyl)-1H-indazol-3-yloxy]acetate is obtained as a white solid, melting at about 93°–94° C.

Analysis:
Calculated for: $C_{21}H_{18}F_6N_2O_3$: C, 54.79; H, 3.94; N, 6.09
Found: C, 54.99; H, 4.08; N, 5.96

Limb Volume Test

| Dosage | Percent Change From Control |
|---|---|
| 5 (SQ) | 23.1 |
| 60 (b) | 21.8 |
| 120 (b) | 3.8 |

EXAMPLE 7. Ethyl[1-(3,5-bis[trifluoromethyl]benzyl)-1H-indazol-3-yloxy]acetate

By the procedure of example 1, using 1-[3,5-bis(trifluoromethyl)benzyl]f-1H-indazol-3-ol in place of 1-[3,5 bis(trifluoromethyl)phenylfq1H-indazol-3-ol, ethyl(1-[3,5-bis(trifluoromethyl)phenyl]f-1H-indazol-3-yloxy]acetate was obtained, melting at about 98°–99° C.

Analysis:
Calculated for: $C_{20}H_{16}F_6N_2O_3$: C, 53.82; H, 3.61; N, 6.28
Found: C, 53.66; H, 3.40; N, 6.37

Limb Volume Test

| Dosage | Percent Change From Control |
|---|---|
| 40 (b) | 0.0 |
| 120 (b) | 14.8 |

EXAMPLE 8. 2-Diethylaminoethyl(1-[3,5-bis(trifluoromethyl)phenyl]f-1H-indazol-3-yloxy)acetate hydrochloride A mixture of 19.8 grams of 1-[3,5-bis,(trifluoromethyl)phenyl]g-1H-indazol-3lyloxy)acetic acid in 100 ml. isopropanol and 7.1 grams of 2-diethylaminoethyl chloride in 60 ml. of toluene was refluxed for 16 hours. The solvents were removed by distillation at reduced pressure and the residue was equilibrated with about a liter of water and 500 ml. of ether. The aqueous layer was rendered slightly basic with sodium bicarbonate and extracted with ether. The ether solution was dried with magnesium sulfate and neutralized with ethereal hydrogen chloride solution. White crystals of 2-diethylaminoethyl(1-[3,5-bis(trifluoromethyl)phenyl]-1H-indazol-3-yloxy)acetate hydrochloride was obtained, melting at about 118°–119° C.

Analysis:
Calculated for: $C_{23}H_{23}F_6N_3O_3 \cdot HCl$: C, 51.16; H, 4.48; N, 7.78
Found: C, 50.97; H, 4.29; N, 7.78

Limb Volume Test

| Dosage | Percent Change From Control |
|---|---|
| 10 (b) | 25.8 |
| 60 (b) | 43.5 |

What is claimed is:
1. A compound of the formula

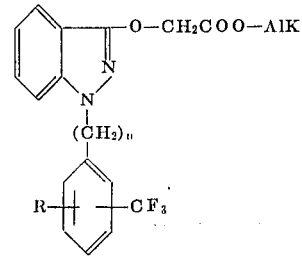

wherein n is 0 or 1, R is trifluoromethyl or halogen and Alk is lower-alkyl or lower-alkyl substituted by one of β-hydroxy, γ-hydroxy, β-methoxy, β-ethoxy, or β-diethylamino.

2. A compound of claim 1 wherein n is 0.
3. A compound of claim 1 wherein Alk is lower-alkyl.
4. A compound of claim 1 wherein R is trifluoromethyl.
5. a compound of claim 1 of the formula

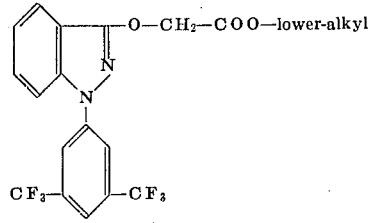

6. A compound of claim 5, methyl[1-(3,5-bis-[trifluoromethyl]1H-indazol-3-yloxy]acetate.
7. A compound of claim 5, ethyl[1-(3,5-bis-[trifluoromethyl]-phenyl)-1H-indazol-3-yloxy]acetate.
8. A compound of claim 5, propyl[1-(3,5-bis-[trifluoromethyl]1H-indazol-3-yloxy]acetate.
9. A compound of claim 1, diethylaminoethyl[1-(3,5-bis-[trifluoromethyl]1H-indazol-3-yloxy]acetate.

* * * * *

UNITED STATES PATENT OFFICE
CERTIFICATE OF CORRECTION

Patent No. 3,625,971　　　　　　　　　Dated December 7, 1971

Inventor(s) Laszlo Ambrus

It is certified that error appears in the above-identified patent and that said Letters Patent are hereby corrected as shown below:

In the Specification:

Col. 3, line 33, "11" should be ---anti-inflammatory---;

Col. 6, line 38, "3-yloxy]" should be ---3-yloxy]acetate---;

Col. 7, line 31, "phenyl]f-1H" should be ---benzyl-1H---;

Col. 7, line 49, "phenyl]g-1H" should be ---phenyl]-1H---

In the Claims:

Claim 6, line 2, "[trifluoromethyl] 1H" should be ---[trifluoromethyl]-phenyl)-1H---;

Claim 8, line 2, "[trifluoromethyl] 1H" should be ---[trifluoromethyl]-phenyl)-1H---;

Claim 9, line 2, "[trifluoromethyl] 1H" should be ---[trifluoromethyl]-phenyl)-1H---;

Signed and sealed this 27th day of June 1972.

(SEAL)
Attest:

EDWARD M. FLETCHER, JR.　　　　　ROBERT GOTTSCHALK
Attesting Officer　　　　　　　　　Commissioner of Patents